United States Patent [19]
Pierce et al.

[11] Patent Number: 5,503,604
[45] Date of Patent: Apr. 2, 1996

[54] MULTIPLE-SPEED AUTOMATIC TRANSMISSION FOR MOTOR VEHICLES

[75] Inventors: Stanley L. Pierce; Clinton F. Justice, both of Northville, Mich.

[73] Assignee: Ford Motor Company, Dearborn, Mich.

[21] Appl. No.: 364,379

[22] Filed: Dec. 27, 1994

[51] Int. Cl.$^6$ ..................................................... F16H 3/62
[52] U.S. Cl. ........................... 475/276; 475/281; 475/292
[58] Field of Search ...................................... 475/275, 284, 475/285, 276, 277, 278, 279, 281, 283, 287, 289, 291, 292

[56] References Cited

U.S. PATENT DOCUMENTS

| | | | |
|---|---|---|---|
| 5,039,305 | 8/1991 | Pierce | 475/71 |
| 5,069,656 | 12/1991 | Sherman | 475/284 |
| 5,106,352 | 4/1992 | Lepelletier | 475/280 |
| 5,230,671 | 7/1993 | Michioka et al. | 475/286 |
| 5,250,011 | 10/1993 | Pierce | 475/276 |
| 5,267,913 | 12/1993 | Biem et al. | 475/218 |
| 5,267,916 | 12/1993 | Biem et al. | 475/285 |

FOREIGN PATENT DOCUMENTS

579526A1  1/1994  European Pat. Off. ............... 475/275

OTHER PUBLICATIONS

USSN 08/103,373, filed Aug. 9, 1993, "Multiple Speed Automatic Transmission for Automotive Vehicles", to Pierce.

*Primary Examiner*—Charles A. Marmor
*Assistant Examiner*—Sherry Estremsky
*Attorney, Agent, or Firm*—Frank G. McKenzie; Roger L. May

[57] ABSTRACT

A multiple-speed automatic transmission for automotive vehicles able to produce three underdrive speed ratios, a near direct ratio, and two overdrive ratios. A kinematic arrangement includes three simple planetary gear units (48, 50, 52). One of these produces an underdrive output drivably connected to components of the other gear units, three friction clutches (118, 120, 122) to friction brakes (124, 126), an overrunning coupling (82), a final drive gearset (94), a differential mechanism (102), a chain drive mechanism (30) for transmitting power from the turbine (16) of a torque converter (10) to the input shaft, which drives elements of the planetary gear units.

4 Claims, 1 Drawing Sheet

MULTIPLE-SPEED AUTOMATIC TRANSMISSION FOR MOTOR VEHICLES

BACKGROUND OF THE INVENTION

1. Field of the Invention

This invention relates to the field of automatic transmissions for motor vehicles. More particularly, the invention pertains to the kinematic arrangement of planetary gearing, clutches, brakes, and overrunning couplings for such transmissions.

2. Description of the Prior Art

This invention comprises a transaxle assembly having a hydrokinetic torque converter and multiple ratio gearing for use with an internal combustion vehicle engine. In a preferred embodiment, the engine and the transaxle are mounted in a common powertrain package with the axis of the crankshaft of the engine in alignment with the axis of the hydrokinetic torque converter. The multiple ratio planetary gearing is mounted on the output shaft axis, which is arranged in parallel with the converter axis. The engine and the output shaft axis may be mounted transversely in the engine and transaxle compartment of a front wheel drive vehicle with forward traction wheels.

Various arrangements of gearing, clutches, brakes, and couplings for multiple-speed ratio power transmissions include two planetary gear units having some of their components mutually interconnected and another planetary gear unit, or pair of meshing pinions and gears, located between the engine and the two planetary gear units. Input speed to the two planetary gear units is provided either through a direct drive connection to the engine or through a gear mechanism that underdrives the input. Therefore, torque applied to the components of the two planetary gear units is greater than it would be if the input were driven at a higher speed. Consequently, those components and the friction elements that control them are larger and heavier than if torque carried by them were lower.

Examples of multiple-speed planetary gear units having a two-speed input are described in U.S. Pat. Nos. 5,039,305; 5,250,011; 5,267,913; and 5,267,916.

It is preferable to overdrive the inputs to the multiple-speed gear units so that torque carried by them and the associated control members is reduced. This permits a reduction in size and weight of the components located at the rear of the gear box.

SUMMARY OF THE INVENTION

This invention is an automatic transmission capable of producing six forward speed ratios and a reverse drive ratio. The six forward speed ratios include three underdrive ratios, a near direct drive ratio, and two overdrive ratios. The transmission avoids the disadvantages present in the prior art by overdriving input members of the multiple speed ratio planetary gear units in relation to the speed of the input shaft driven by the engine.

A multiple speed ratio automatic transmission according to the present invention includes an input shaft and an output shaft. First, second and third gear units are arranged coaxially, each gear unit having a sun gear, ring gear, planet pinions meshing with the sun gear and ring gear, and carrier rotatably supporting the planet pinions. The sun gear of the first gear unit, carrier of the third gear unit and input shaft are drivably connected mutually. The carrier of the first gear unit, ring gear of the second gear unit and output shaft are drivably connected mutually. The carrier of the second gear unit is drivably connected to the overrunning brake. The sun gear of the third gear unit is fixed against rotation.

An overrunning brake holds the carrier of the second gear unit against rotation in one rotary direction and overruns in the opposite direction. A first clutch releasably connects the ring gear of the first gear unit and carrier of the second gear unit. A second clutch releasably connects the ring gear of the third gear unit and carrier of the second gear unit. A third clutch releasably connects the carrier of the third gear unit and sun gear of the second gear unit.

A first brake releasably holds the carrier of the second gear unit, and a second brake releasably holds the sun gear of the second gear unit against rotation.

BRIEF DESCRIPTION OF THE DRAWINGS

FIG. 2 is a chart that shows the pattern of engagement and release of the clutches, brakes, and couplings required to produce the various forward drive ratios and reverse ratio for the transmission mechanism of FIG. 1.

DESCRIPTION OF THE PREFERRED EMBODIMENT

Figure 1:
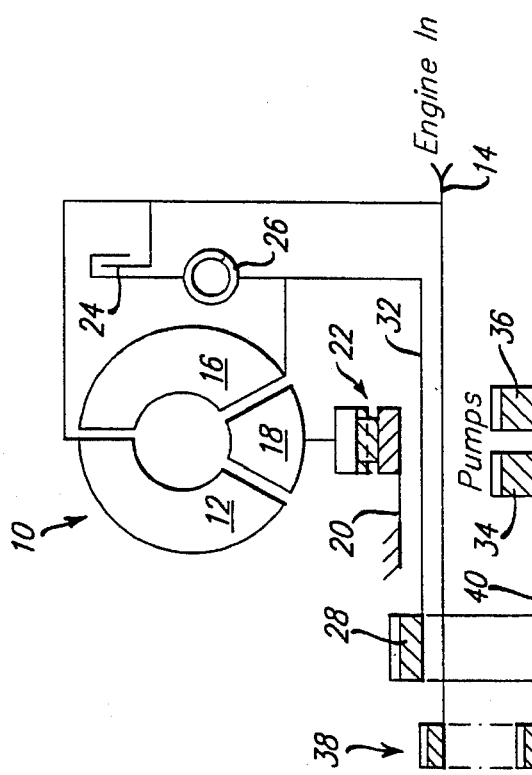
FIG. 1 is a schematic diagram of the kinematic arrangement of the gears, clutches, brakes, and couplings for a preferred embodiment of this invention.
Figure 1:
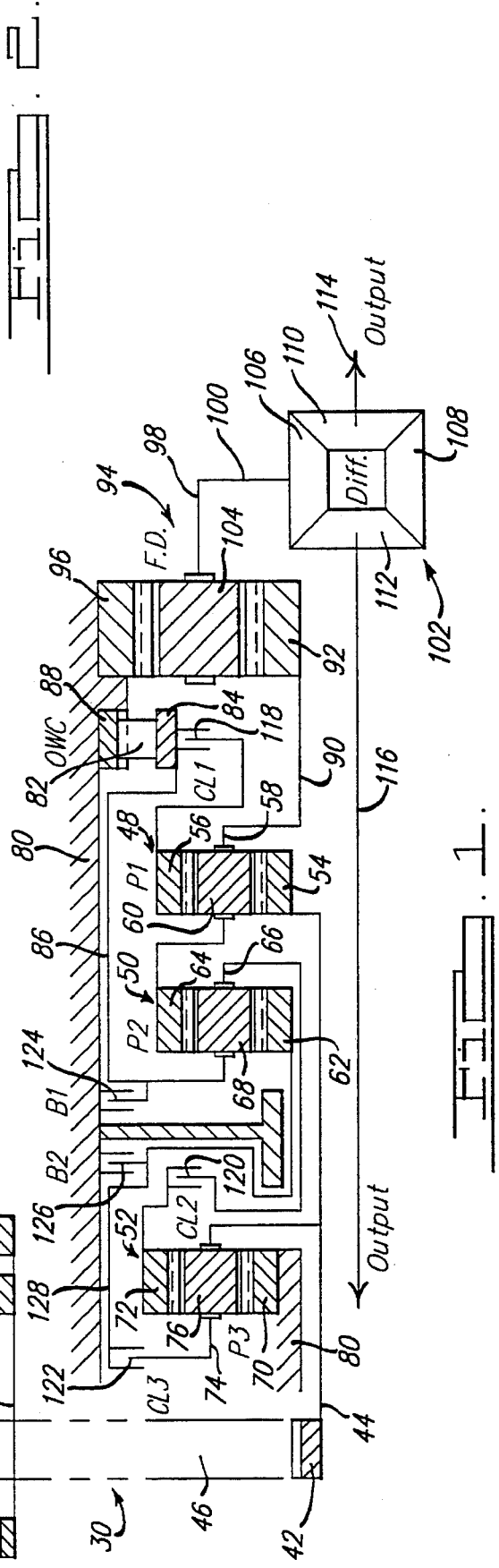

Referring first to FIG. 1, a hydrokinetic torque converter 10 includes an impeller 12 connected to the crankshaft 14 of an internal combustion engine. A bladed turbine 16, a bladed stator 18, and the impeller define a toroidal fluid flow circuit, whereby the impeller is hydrokinetically connected to the turbine. The stator 18 is supported rotatably on a stationary stator sleeve shaft 20, and an overrunning brake 22 anchors the stator to shaft 20 to prevent rotation of the stator in the direction opposite the direction of rotation of the impeller, although free-wheeling motion in the opposite direction is permitted.

The torque converter assembly includes a lock-up clutch 24 located within the torque converter impeller housing. Arranged in series with the lock-up clutch 24 between crankshaft 14 and turbine wheel 16 is a damper 26, which is drivably connected both to the turbine wheel and to a sheave or sprocket wheel 28 of a chain drive mechanism 30 through a sleeve shaft 32 arranged parallel to crankshaft 14. The damper absorbs transient torque fluctuations associated with engagement of the lock-up clutch 14. Fluid to the torque converter is supplied from the output of hydraulic pumps 34, 36, which are driven through a drive mechanism such as a chain drive 38 having a sheave or sprocket wheel drivably connected to crankshaft 14 and another sheave or sprocket wheel connected to the input shaft 40 of the pumps.

The chain drive mechanism includes a sheave 42 fixed to a transmission input shaft 44, which is drivably connected to elements of several planetary gear units arranged coaxially with shaft 44. Power is transmitted between crankshaft 14 and input shaft 24 by a drive belt or chain 46, which engages the sprockets or sheaves 28, 42.

Planetary gearing includes first, second, and third planetary gear units 48, 50, 52. The first gear unit 48 includes a sun gear 54, ring gear 56, pinion carrier 58, and a set of planet pinions 60 supported rotatably on carrier 58 in meshing engagement with sun gear 54 and ring gear 56. The second gear unit 50 includes a sun gear 62, ring gear 64, pinion carrier 66, and a set of planet pinions 68 rotatably supported on carrier 66 in meshing engagement with sun gear 62 and ring gear 64. The third gear unit 52 includes a sun gear 70, ring gear 72, pinion carrier 74, and a set of planet pinions 76 rotatably supported on carrier 74 in meshing engagement with ring gear 72 and sun gear 70. Carrier 74 and sun gear 54 are drivably connected directly to input shaft 44. Ring gear 70 is permanently fixed against rotation on the transmission housing 80.

One-way brake 82 includes an inner race 84 drivably connected by member 86 to carrier 66, an outer race 88 fixed against rotation on the transmission housing 80, and a set of drive elements located in the annular space between the inner race and outer race adapted to complete a one-way drive connection between the races and to allow the inner race to turn with respect to the outer race in the opposite direction of rotation.

Carrier 58 is continually drivably connected to ring gear 64 and is connected through output sleeve shaft 90 to the ring gear 92 of a final drive gearset 94, which includes a ring gear 96 permanently fixed against rotation on the transmission housing, pinion carrier 98 connected to spindle 100 of an axle differential mechanism 102, and a set of planet pinions 104 rotatably supported on carrier 98 in meshing engagement with ring gear 96 and sun gear 92. Spindle 100 rotatably drives bevel pinions 106, 108, which are in continual mutual driving engagement with side gears 110, 112, respectively drivably connected to right-hand and left-hand drive shafts 114, 116.

Forward clutch (CL1) 118 is a fluid-actuated, friction clutch whose engagement drivably connects carrier 66 and ring gear 56. Clutch (CL2) 120 drivably connects and releases carrier 66 and ring gear 72. Clutch (CL3) 122 drivably connects and releases carrier 74 and sun gear 62. Brake (B1) 124 establishes and disestablishes a drive connection between member 86 and the transmission casing, thereby holding against rotation and releasing carrier 66, ring gear 56, and race 84. Brake (B2) 126 establishes and disestablishes a drive connection between member 128 and the transmission casing, thereby holding against rotation and releasing sun gear 62.

FIG. 2 contains a schedule showing the engaged and disengaged states of friction clutches 118, 120, 122 and brakes 124, 126, and the driving and overrunning condition of one-way coupling 82.

The first speed ratio in the drive condition results by engaging clutch 118. This causes coupling 82 to drive and thereby to hold carrier 66 and ring gear 56 against rotation on the transmission housing. The sun gear 54 of the first gear unit is driven through the chain drive mechanism 30, ring gear 56 is held fixed against rotation through clutch 118 and coupling 82, and the output is taken at carrier 56 and shaft 90. The final drive gearset 94 has sun gear 92 driven directly from shaft 90 and ring gear 96 permanently fixed against rotation on the transmission housing. The output is taken at carrier 98, which drives the spindle 100 of the differential mechanism 102. Side bevel gears 110, 112 are driven through bevel pinions 106, 108 and transmit power to the right-hand and left-hand axle shafts 114, 116, respectively.

During a coast condition in first gear, i.e., when power is transmitted from the axle shafts through the transmission mechanism to the engine shaft 14, coupling 82 overruns; therefore, brake 124 is applied to produce a torque reaction on the transmission housing by holding ring gear 56 against rotation. Carrier 58 is driven by the wheels of the vehicle and sun gear 54 drives engine shaft 14 through the chain mechanism 30.

The second speed ratio results by maintaining clutch 118 applied and applying brake 126. When this occurs, coupling 82 overruns as sun gear 62 of the second planetary gear unit is held fixed against rotation through operation of brake 126. Power is transmitted from the engine, through the chain drive mechanism 30 and input shaft 44, to sun gear 54 of the first gear unit 48. Carrier 58 drives ring gear 64, sun gear 62 provides a torque reaction, and carrier 66 is drivably connected through member 86 and clutch 118 to ring gear 56. The output is taken at carrier 58 and output shaft 90, which drives differential gear mechanism 102 through the final drive gearset 94.

The third forward gear ratio results by maintaining clutch 118 engaged, disengaging brake 126, and engaging clutch 122. With the friction elements and coupling so disposed, input shaft 44 drives sun gear 54 directly, and shaft 44 drives sun gear 62 through member 128, clutch 122, and carrier 74. Carrier 66 and ring gear 56 are drivably connected through member 86 and clutch 118, and the output of gear unit 50 is taken at ring gear 64, carrier 58, and output shaft 90. The third forward speed ratio is an underdrive ratio. The torque reaction is provided at ring gear 70, which is fixed on the transmission housing against rotation.

The fourth forward speed ratio is approximately a direct drive ratio that results by maintaining clutch 118 engaged, releasing clutch 122, and engaging clutch 120. This action causes coupling 82 to overrun.

The third planetary gear unit 52 overdrives ring gear 72 in relation to the speed of input shaft 44. Torque output from gear unit 52 is transmitted through clutch 120, carrier 66, member 86, and clutch 118 to ring gear 56 of the first planetary gear unit 48. Sun gear 54 is driven at the speed of the input shaft 44, and the output is taken at ring gear 64, carrier 58, and output shaft 90. Torque reaction is provided at ring gear 70, which is held fixed against rotation on the transmission housing.

An upshift to the fifth forward speed ratio results when clutch 118 is disengaged, clutch 120 is maintained engaged, and clutch 122 is engaged. When these friction elements are fully engaged and disengaged, coupling 82 overruns and output shaft 90 is overdriven in relation to the speed of shaft 44. In this instance, two components of planetary gear units 48 and 50 are driven at different speeds through the third planetary gear unit 52. Input shaft 44 is drivably connected through carrier 74, clutch 122, and member 128 to ring gear 62 at the same speed as that of input shaft 44, but a speed reduction occurs in gear unit 52 such that ring gear 72 overdrives carrier 66 through clutch 120. Sun gear 54 is drivably connected directly to input shaft 44 so that both sun gears 54, 62 are driven at the same speed and carrier 66 is overdriven. The output of the gear units is taken at sun gear 64, carrier 58, and output shaft 90.

An upshift to the sixth forward speed ratio results by maintaining clutch 120 engaged, disengaging clutch 122, and engaging brake 126. With the friction elements so disposed, coupling 82 overruns. In this speed ratio, ring gear 54 is driven directly from input shaft 44, but carrier 66 is overdriven through clutch 120 by third gear unit 52, whose carrier 74 is driven from input shaft 44 and whose ring gear 70 is fixed against rotation. Sun gear 62 of the second gear unit 50 is fixed against rotation on the transmission housing through engagement of brake 126; therefore, a further speed reduction occurs in gear unit 50, and its ring gear 64 drives the output carrier 58 and output shaft 90.

It is understood that while the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

What is claimed is:

1. A multiple speed ratio automatic transmission, comprising:

an input shaft;

an output shaft;

first, second, and third gear units, each gear unit having a sun gear, ring gear, planet pinions meshing with the sun gear and ring gear, and carrier rotatably supporting the planet pinions;

the sun gear of the first gear unit, carrier of the third gear unit and input shaft drivably connected mutually; the carrier of the first gear unit, ring gear of the second gear unit and output shaft drivably connected mutually; the sun gear of the third gear unit fixed against rotation;

an overrunning brake holding the carrier of the second gear unit against rotation in one rotary direction and overrunning in the opposite direction;

a first clutch releasably connecting the ring gear of the first gear unit and carrier of the second gear unit;

a second clutch releasably connecting the ring gear of the third gear unit and carrier of the second gear unit;

a third clutch releasably connecting the carrier of the third gear unit and sun gear of the second gear unit;

a first brake releasably holding the carrier of the second gear unit; and a second brake releasably holding the sun gear of the second gear unit against rotation.

2. The transmission of claim 1, further comprising:

a torque converter mounted for rotation about an axis parallel to the input shaft, adapted for connection to a power source, for producing an hydrokinetic drive connection between the input shaft and power source; and a chain drive mechanism for transmitting power between the power source and input shaft.

3. The transmission of claim 1, wherein the overrunning brake means comprises:

an overrunning coupling having a first race fixed against rotation;

a second race concentric with and radially spaced from the first race; and a coupler located between the races for producing a one-way brake connection in one rotary direction therebetween and permitting free rotation in the opposite rotary direction.

4. The transmission of claim 2, wherein:

the carrier of the second gear unit is drivably connected to a second race of the overrunning brake;

the first clutch releasably connects the ring gear of the first gear unit to the second race of the overrunning brake and the carrier of the second gear unit; and first brake releasably holds the carrier of the second gear unit and second race of the overrunning brake against rotation.

* * * * *